INVENTOR.
William G. Livezey
BY
Ronald L. Phillips
ATTORNEY

United States Patent Office 3,492,891
Patented Feb. 3, 1970

3,492,891
SINGLE SPEED RANGE INPUT-SPLIT-POWER DRIVE, MULTISPEED RANGE COMPOUND-SPLIT-POWER DRIVE, POWER TRAIN
William G. Livezey, Indianapolis, Ind., assignor to General Motors Corporation, Detroit, Mich., a corporation of Delaware
Filed July 3, 1968, Ser. No. 742,373
Int. Cl. F16h 37/06, 47/04
U.S. Cl. 74—720.5          5 Claims

ABSTRACT OF THE DISCLOSURE

A vehicle power train is disclosed in the preferred embodiment as having a hydrostatic unit cooperating with a power splitter planetary gear unit and a power combiner planetary gear unit to provide a low speed range input-split-power drive, an intermediate speed range compound-split-power drive, and high speed range compound-split-power drive. Shifts between the drives are provided by speed and torque synchronized friction drive establishing devices. The power train provides single output for on-the-road vehicles and dual output with a hydrostatically controlled steer bias for off-the-road, steer-by-driving vehicles.

---

This invention relates to hydromechanical power trains and more particularly to a single input, single and dual output hydromechanical power train providing input-split-power drive and a plurality of compound-split-power drives.

It is well known in the vehicle power train or transmission art to provide a hydrostatic drive cooperating with an all mechanical drive so that the advantages of both are available. It is also well known that the speed range coverage, i.e., the speed ratio between input and output, can be extended. This can be accomplished by providing the mechanical power path with gearing offering a selection of different speed ratios, the drives being established by friction devices.

It is desirable in split power drives that the hydraulic power path not be subjected to a rapid reversal of speed and torque during range shifting to both simplify hydrostatic unit operaiton and reduce wear in the friction drive establishing devices. It is also desirable to avoid both mechanical regeneration and hydraulic regeneration in all drive phases as much as possible to establish low duty requirements for the mechanical and hydraulic components to promote their durability. In addition, it is desirable that the power train provide 100% or full mechanical drive for high power train efficiency at several vehicle speeds. A hydromechanical power train providing two node points where the power is transmitted by all mechanical drive is disclosed in my copending United State patent application Ser. No. 675,383 filed Oct. 16, 1967, and entitled, "Input-Split-Power, Output-Split-Power, Compound-Split-Power, Power Train."

According to the present invention simple planetary gearing is combined with drive establishing devices and a hydrostatic propulsion unit to provide input-split-power drive in a low speed range and compound-split-power drive in both an intermediate and high speed range to minimize both mechanical regeneration and hydraulic regeneration and maintain hydraulic power below input power over a large input-output speed ratio range. The friction drive establishing devices are connected in the power train to provide speed and torque synchronized shifting between the speed ranges while full power transmittal is maintained. The power train drivingly connects an input to a single output for propelling a nonsteer-by-driving vehicle and drivingly connects the input to a pair of outputs by separate speed differential planetary gearing for propelling a steer-by-driving vehicle. In the case of steer-by-driving vehicles, an input driven hydrostatic steer unit cooperates with the speed differential planetary gearing to provide infinitely variable steer ratios by controlling speed differential between the two outputs.

The provision of the high speed range compound-split-power drive above the intermediate speed range compound-split-power drive provides for 100% mechanical power transmittal at the highest output speed in addition to similar conditions which occur at the optimum shift point between the low and intermediate speed range and between the intermediate and high speed range. Thus, the power train according to the present invention provides three node points where the power is transmitted by all mechanical drive for increased operational efficiency. Furthermore, at the power train's optimum shift points, the friction drive establishing device to be engaged on the shift is speed and torque synchronized, i e., the friction drive establishing device being engaged is not subjected to a speed differential and is free of torque. Since all the power continues to be transmitted mechanically during shifting at these optimum shift points, there is no power interruption or power transfer diminution during the shifts.

An object of the present invention is to provide a power train having input-split-power drive, a plurality of compound-split-power drives, and speed and torque synchronized shifts.

Another object is to provide a power train having three split-power drives combined to provide all mechanical drive for power transmittal at three input-output speed ratios.

Another object is to provide simple power splitter gearing and simple power combiner gearing combined with a hydrostatic propulsion unit to provide a low speed range input-split-power drive, an intermediate speed range compound-split-power drive and a high speed range compound-split-power drive to one output and also combined with speed differential gearing and a hydrostatic steer unit to provide the hydromechanical drives to two outputs with a hydrostatically controlled speed differential between the two outputs.

Another object is to provide a hydromechanical power train having a low speed range input-split-power drive, and intermediate speed range compound-split-power drive and a high speed range compound-split-power drive without the occurrence of mechanical regeneration in all speed ranges, without the occurrence of hydraulic regeneration in the low and high speed range and hydraulic regeneration amounting to only a small part of input power in the intermediate speed range, and the hydraulic power diminishing to zero at low, medium and high input-output speed ratios, and the shifts between ranges accomplished with friction drive establishing devices which are speed synchronized and torque free at both the low and medium input-output speed ratio.

These and other objects of the present invention will become more apparent from the following description and drawing in which:

FIGURE 1 diagrammatically shows a power train constructed according to the present invention.

FIGURE 3 shows typical performance characteristics of the hydromechanical portion of the power train.

Figure 1:
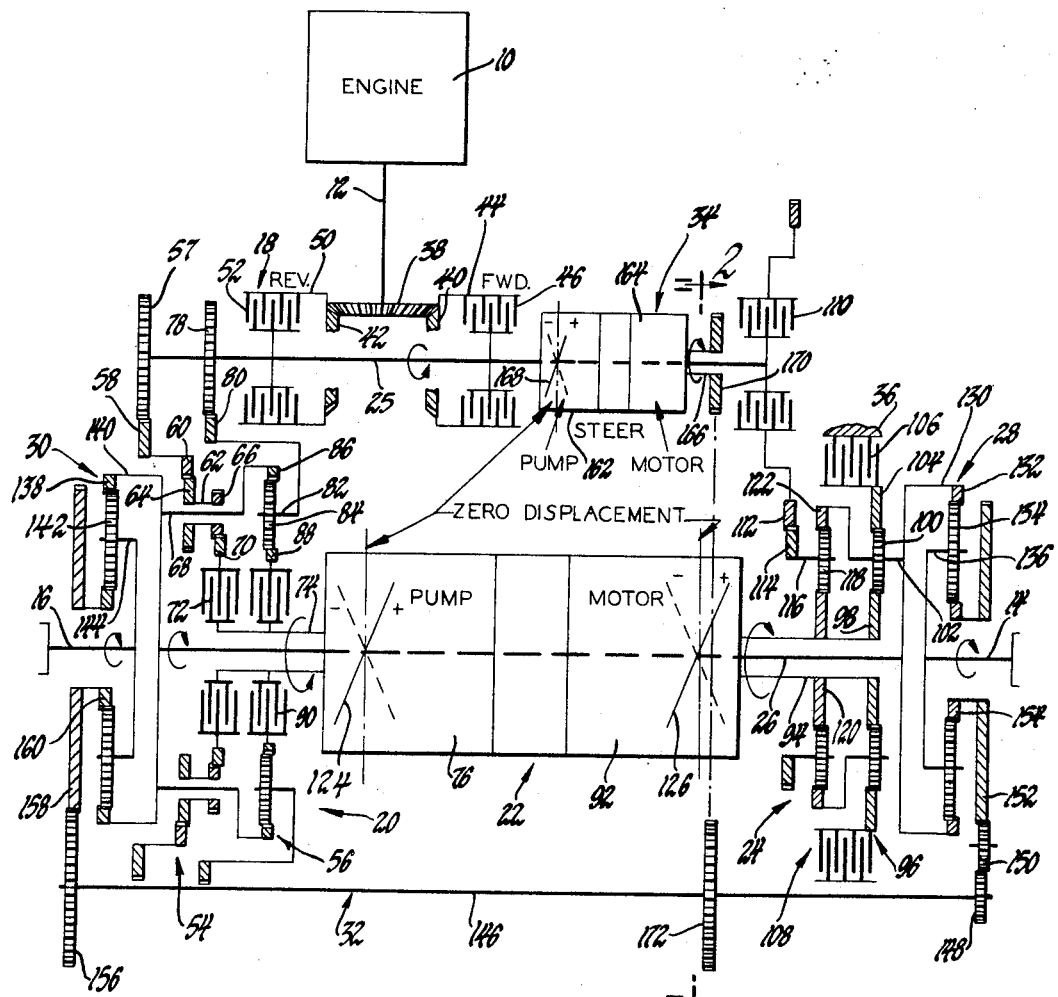

Referring first to FIGURE 1, the invention is illustrated for use in a vehicle of the track-laying type with steerby-driving, the vehicle being powered by a longitudinally arranged engine 10. For this use the power train generally comprises an engine driven input shaft 12 drivingly connected to coaxially arranged output shafts 14 and 16 by a forward and reverse drive unit 18, a power splitter planetary gear unit 20, a hydrostatic propulsion unit 22 and a power combiner and torque multiplier planetary gear unit 24 with units 20, 22 and 24 providing hydromechanical drive between cross-shafts 25 and 26. The hydromechanically driven shaft 26 is coaxial with and drivingly connected to the output shafts 14 and 16 by speed differential planetary gear units 28 and 30, respectively. The speed differential gear units 28 and 30 are coupled by a gear train 32 to provide torque reaction for propulsion drive. Further in the case of track-laying vehicles, steering is provided by a hydrostatic steer unit 34 drivingly connected between input shaft 12 and gear train 32. With input from the hydrostatic steer unit 34, the gear train 32 provides opposite directional drives to the speed differential gear units 28 and 30 to effect a speed differential between output shafts 14 and 16 for steering. The output shafts 14 and 16 in the case of track-laying vehicles are drivingly connected to the vehicle's endless tracks. All of the components of the power train are suitably supported in a power train housing generally designated as 36. The central axes of components 18, 25 and 34 are aligned and parallel to the aligned central axes of components 14, 16, 20, 22, 24, 26, 28 and 30 to provide a compact power train structure characterized by the short length.

Describing these components and their power train connections in detail, the power train input shaft 12 is connected to bevel gear 38 of the forward and reverse drive unit 18. Gear 38 meshes at diametrically opposite sides and at right angles with a forward drive bevel side gear 40 and a reverse drive bevel side gear 42. The annular side gears 40 and 42 are suitably supported for rotation about the cross-shaft 25 which extends freely therethrough. The forward drive side gear 40 is connected to a forward drive drum 44 and drum 44 is connected by engagement of a forward drive clutch 46 to cross-shaft 25. The reverse drive side gear 42 is connected to a reverse drive drum 50 and drum 50 is connected by engagement of a reverse drive clutch 52 to cross-shaft 25. The engine driven input shaft 12 drives in only one direction and engagement of the forward drive clutch 46 serves to drive the cross-shaft 25 in one direction. Alternatively, engagement of reverse drive clutch 52 serves to drive cross-shaft 25 in the opposite direction.

Cross-shaft 25 provides input to the power train's hydromechanical portion which includes the power splitter planetary gear unit 20. Unit 20 comprises a low speed coverage planetary gear set 54 and a high speed coverage planetary gear set 56.

Input to the low speed coverage splitter gear set 54 is provided by connection of the hydromechanical input shaft 25 at its left end to a spur gear 57. Gear 57 meshes with an annular, external toothed, spur gear 58 connected to input ring gear 60 of gear set 54. Gear set 54 is of the compound pinion type having compound pinion members 62 each with an integral large pinion 64 and an integral small pinion 66. The compound pinion members 62 are rotatably supported on output carrier 68 secured to the left end of the cross-shaft 26 which provides output from the hydromechanical portion of the power train. Each large diameter pinion 64 meshes with ring gear 60 and each small diameter pinion 66 meshes with output sun gear 70. Sun gear 70 is connected by engagement of a dual purpose, low-intermediate drive range clutch 72 to a sleeve shaft 74 which provides input to the hydrostatic propulsion unit's pump 76. Shaft 74 is freely received on the hydromechanical output shaft 26 with the clutch 72 radially arranged between shaft 74 and sun gear 70.

Input to the high speed coverage splitter gear set 56 is provided by connection of the hydromechanical input shaft 25 inboard of gear 57 to a spur gear 78. Gear 78 meshes with an annular, external toothed, spur gear 80 connected to input carrier 82 of gear set 56. Gear set 56 is of the single pinion type having pinions 84 rotatably supported on carrier 82. Each pinion 84 meshes with output ring gear 86. Ring gear 86 is connected by carrier 68 of gear set 54 to the hydromechanical output shaft 26. Each pinion 84 also meshes with output sun gear 88. Sun gear 88 is connected by engagement of a single purpose, high drive range clutch 90 to the propulsion pump's input shaft 74, clutch 90 being radially arranged between shaft 74 and sun gear 88.

Referring now to the final portion of the hydromechanical drive train, the hydrostatic propulsion unit's motor 92 is connected to a motor output sleeve shaft 94 received on the hydromechanical output shaft 26 which extends freely through the center of the hydrostatic unit. The motor output shaft 94 is drivingly connected to the hydromechanical output shaft 26 by a torque multiplier planetary gear set 96 provided in power combiner and torque multiplier unit 24. This driving connection is provided by connection of the motor output shaft 94 to input sun gear 98 of gear set 96. Sun gear 98 meshes with pinions 100 which are rotatably supported on output carrier 102 connected to the right end of the hydromechanical output shaft 26. Each pinion 100 meshes with the gear set's reaction ring gear 104 which is braked by engagement of a single purpose, low drive range brake 106 grounded to the power train housing.

In the power combining portion of the hydromechanical drive train arrangement, the hydromechanical input shaft 25 which extends freely through the center of the hydrostatic steer unit 34 is drivingly connected to a power combiner planetary gear set 108 provided in the power combiner and torque multiplier gear unit 24. This driving connection is provided by connecting the right end of shaft 25 by engagement of a dual purpose, intermediate-high drive range clutch 110 to an annular, external toothed, spur gear 112 which is supported for rotation about the axis of shaft 25. Gear 112 meshes with an annular, external toothed, spur gear 114 which is connected to input carrier 116 of power combiner gear set 108. In gear set 108, pinions 118 are supported for rotation on carrier 116. Each pinion 118 meshes with input sun gear 120 and output ring gear 122. Sun gear 120 is connected to the propulsion motor's output shaft 94 and ring gear 122 is connected by carrier 102 of the torque multiplier gear set 96 to the hydromechanical output shaft 26.

The hydrostatic propulsion unit's pump 76 and motor 92 both have variable displacements and are connected by a hydraulic system provided with the normal relief valve to protect against excessive pressure. Pump displacement and motor displacement are controlled by variable angle swash plates 124 and 126, respectively, the principles of operation of the pump and motor being well known in the art.

The brake and clutches which are friction drive establishing devices and the hydrostatic propulsion unit are conventional and may be operated in any known way, e.g. electrically, hydraulically, pneumatically, or by some mechanical provision and according to a certain schedule. At this point it will be appreciated that the hydromechanical portion of the power train arrangement that has been described in detail is suitable for use in a vehicle requiring only single transmission output, i.e., using the single output of the hydromechanical drive from shaft 26 as distinguished from using the dual outputs from shafts 14 and 16 for track-laying vehicles. Furthermore, it is believed that a thorough understanding of the operation of the hydromechanical drives with output at the hydromechanical output shaft 26 will be helpful before proceeding to the hydromechanical drive to two power train outputs for use in steer-by-driving vehicles.

SINGLE OUTPUT TRAIN OPERATION

The hydromechanical portion of my power train arrangement shown in FIGURE 1 is operable as a transmission to selectively provide a low speed range input-split-power drive, an intermediate speed range compound-split-power drive and a high speed range compound-split-power drive between hydromechanical input shaft 25 and hydromechanical output shaft 26. In the following description of operation of the hydromechanical portion of the power train which comprises components 20, 22, 24, 25 and 26, input is assumed as that of shaft 25 and output as that of shaft 26. FIGURE 3 which shows typical performance characteristics has been provided to aid in describing the operation of the hydromechanical drives. In FIGURE 3 performance measured along the ordinate is plotted against the output speed of the hydromechanical output shaft 26 measured along the abscissa. Input speed of the hydromechanical input shaft 25 is considered as being constant and equal to unity throughout the output speed range.

In my hydromechanical arrangement the friction drive establishing device that is to be engaged to establish drive is speed synchronized and torque free at an optimum shift condition. These conditions occur at a particular shift point between the low and intermediate speed range (optimum 1–2 shift point) and a particular shift point between the intermediate and high speed range (optimum 2–3 shift point). An example of gear teeth numbers that will give these results in my hydromechanical arrangement are as follows:

| Gear member: | Number of gear teeth |
|---|---|
| Spur gear 57 | 34 |
| Spur gear 58 | 63 |
| Spur gear 78 | 47 |
| Spur gear 80 | 50 |
| Spur gear 112 | 23 |
| Spur gear 114 | 40 |
| Ring gear 60 | 72 |
| Pinion 64 | 22 |
| Pinion 66 | 14 |
| Sun gear 70 | 36 |
| Ring gear 86 | 71 |
| Sun gear 88 | 31 |
| Ring gear 122 | 71 |
| Sun gear 120 | 31 |
| Ring gear 104 | 72 |
| Sun gear 98 | 24 |

With regard to the plotting of the performance characteristics, directional senses are used which are referred to as forward or positive (+) and backward or negative (−). These directional senses relate to the direction of rotation or speed (N), torque (T) and power (P). These latter designations are used in the graph with numeral subscripts denoting the components as numbered in FIGURE 1. Directions of rotation of several of the components is indicated by directional arrows in FIGURE 1. All of the directional arrows show what is considered a component's forward or positive (+) rotation. Rotation of a component in the opposite direction of an arrow is considered backward or negative (−) rotation. With regard to torque, which is shown plotted for the hydrostatic propulsion unit's pump 76 and motor 92, pump torque is forward or positive (+) when the pump is being driven as a pump in its forward direction of rotation by its input shaft 74 and is backward or negative (−) when the pump drives its input shaft in the forward direction. Motor torque is forward or positive (+) when the motor is driving its output shaft in its forward direction of rotation and is backward or negative (−) when the motor output shaft is rotating in its forward direction and drives the motor. With regard to the direction of hydraulic power, it is considered as flowing in the forward or positive (+) direction when it is flowing from the input toward the output and backward or negative (−) when flowing from output to input. Since power is the product of torque and speed, power is forward or positive (+) when torque and speed have the same sign. Furthermore, hydraulic power is forward or positive when it is flowing from pump 76 to motor 92. With regard to sign convention for pump and motor displacement, the displacement of pump 76 is positive (+) when its swash plate 124 is moved from a zero displacement position to a positive (+) position as shown in FIGURE 1. Pump displacement is considered negative when its swash plate is moved from the zero displacement position to a negative (−) position as shown by the dashed line. The same applies to the displacement of motor 92 with its swash plate 126.

The performance characteristics shown assume that the input speed, torque and power of the hydromechanical input shaft 25 are each equal to unity only when the engine is operating at full power and speed and that any lesser values at the input are a fractional part of unity. Furthermore, in the preferred embodiment, maximum pump and motor displacement are equal. For simplicity, the mechanical, hydraulic and overall drive train efficiency are considered as 100%.

Proceeding now to how the different hydromechanical drives are established and the operation of the components to vary output speed, the low or first speed range is established by engaging only low drive brake 106 and low-intermediate drive clutch 72. The low speed coverage power splitter planetary gear set 54 is then conditioned to apportion the input power available at the hydromechanical input shaft 25 between the hydraulic power path and the mechanical power path to the hydromechanical output shaft 26. The hydraulic power is via output sun gear 70 of gear set 54, low-intermediate clutch 72, hydrostatic unit 22 and gear set 96. The mechanical power path is via output carrier 68 of gear set 54. The activated torque multiplier gear set 96 which establishes the drive connection in the hydraulic power path between the hydrostatic unit 22 and hydromechanical output shaft 26 is for providing additional torque multiplication and speed reduction in addition to cooperating with the power combiner gear set 108 to synchronize the intermediate-high drive clutch 110 as described in more detail later. Thus, the mechanical power path and hydraulic power path from the power splitter gear set 54 are united at the hydromechanical output shaft 26 to drive shaft 26 with the input-split-power drive thus provided.

For zero output speed at the hydromechanical output shaft 26 ($N_{26}=0$), the hydrostatic unit 22 is conditioned so that the motor 92 is at full positive displacement with its swash plate 126 positioned as shown in FIGURE 1 and the pump 76 is conditioned at zero displacement with its swash plate 124 in a vertical position. In the low speed drive it will be assumed that maximum system pressure which is determined by the hydrostatic system's relief valve occurs throughout this range, and knowing the gear ratios, the values of pump and motor displacement for any output speed $N_{26}$ is established. The following description of pump and motor displacement control is one which will effect the performance characteristics as shown in the graph as the hydromechanical output shaft 26 is accelerated. With zero pump displacement the pump 76 can produce no reaction torque against the input and therefore there is no input torque or power at zero output speed. Since the output carrier 68 of the power splitter gear set 54 is stationary because of reaction from the load at the hydromechanical output shaft 26, the pump input shaft 74 rotates forwardly at the pump idle speed indicated by the pump speed curve $N_{74}$ at its intersection with the ordinate. This speed is fixed by the fixed gear ratio between the hyromechanical input shaft 25 and the pump input shaft 74 which is determined by assuming that the output carrier 68 of gear set 54 is held.

In the input-split-power drive with the low-intermediate drive clutch 72 and the low brake 106 both engaged, the pump 76 must have a torque capacity at full positive displacement and maximum system pressure at least equal to maximum input torque at the hydromechanical shaft 25 multiplied by the fixed gear ratio between the hydromechanical input shaft 25 and the pump input shaft 74. This is to provide the full input-split reaction torque. To accelerate the hydromechanical output shaft 26 in the low speed range, the motor displacement is maintained at its maximum positive value and the pump displacement is increased from zero to positive values. With the hydrostatic system operating at maximum pressure, the pump torque $T_{74}$ increases in proportion to increasing pump displacement while motor torque $T_{94}$ remains constant. Since the motor is the same size as the pump, the maximum motor torque that occurs is equal to maximum input torque at the hydromechanical input shaft 25 multiplied by the aforementioned gear ratio between the hydromechanical input shaft 25 and the pump input shaft 74. At maximum positive pump displacement and maximum positive motor displacement, maximum input torque is absorbed by the hydromechanical drive.

In the low speed range below the cut-off point for limited input power and during the increase in pump displacement from zero while motor displacement remains constant, the pump speed $N_{74}$ decreases in its forward direction and the motor speed $N_{94}$ increases from zero in its forward direction to increase output speed $N_{26}$ in its forward direction. At stall or zero output speed in the low speed range, the hydraulic power $P_{22}$ is zero and increases in its forward direction in proportion to the increasing pump displacement. The hydraulic power reaches its maximum at maximum pump displacement which occurs at the cut-off point, the cut-off point in my particular arrangement occurring at an output speed ($N_{26}$) of 0.1095. This maximum value of hydraulic power is below full input power and the remaining input power is transmitted by the mechanical power path in its forward direction to the output shaft 26. Output speed in the low speed range above the point where full input power absorption occurs is obtained by holding pump displacement at its maximum positive value and decreasing motor displacement. Pump torque $T_{74}$ is then constant and motor torque $T_{94}$ decreases. Pump speed $N_{74}$ thereby continues to decrease in its forward direction and motor speed $N_{94}$ continues to increase in its forward direction to increase the output speed $N_{26}$. With the decreasing motor displacement while maximum pump displacement is maintained, the hydraulic power $P_{22}$ in the low speed range then decreases and the forwardly transmitted mechanical power continues to increase with their sum equal to input power $P_{25}$.

When the motor reaches zero displacement in the low speed range while the pump is maintained at maximum displacement, motor speed $N_{94}$ reaches its maximum which as shown in FIGURE 3 is slightly above input speed $N_{25}$. At this point of low output speed or low input-output speed ratio there is maximum pump torque $T_{74}$ and minimum or zero motor torque $T_{94}$. This point is determined by the gear ratio in the input-split-power mechanical path. With the gear numbers given and the assumption of input speed as unity this point occurs at an output speed of 0.3 as shown. At this point hydraulic power $P_{22}$ is zero and the mechanical power path carries all the input power which is being transmitted forwardly to drive the output shaft 26. This point is also the optimum shift point for shifting between the low and intermediate drive since up to this 1–2 shift point neither gear nor hydraulic regeneration has occurred between the limits of the low speed range thus determined. The gear ratio between the driven clutch member of the intermediate-high drive clutch 110 and the hydromechanical output shaft 26 has been determined so that at this 1–2 shift point the driven clutch member is rotating in the same direction and at the same speed as the driving clutch member in clutch 110. This is illustrated in the graph in FIGURE 3 by clutch slip speed curve $\Delta N_{110}$ of clutch 110 which differential speed is shown as being zero at this 1–2 shift point. Since the motor torque $T_{94}$ is zero at this shift point, the intermediate-high drive clutch 110 is torque unloaded in addition to being speed synchronized.

Accordingly, for an optimum shift from low drive to intermediate drive the low brake 106 is disengaged and the intermediate-high drive clutch 110 is engaged at this 1–2 shift point while the low-intermediate drive clutch 72 remains engaged. The motor and connected torque multiplier carrier 102 rotate in the same direction and at a speed ratio fixed by the gearing so that at this 1–2 shift point the multiplier ring gear 104 is at zero speed and provides no torque reaction, i.e., is torque unloaded in this condition. Thus, the low drive brake 106 is both speed and torque synchronized for a downshift from the intermediate drive to the low drive at the optimum 2–1 shift point. This is illustrated in Figure 3 by the clutch slip speed curve $\Delta N_{106}$ of brake 106 which differential speed is shown as being zero at this point.

The values of $N_{74}$, $T_{74}$, $N_{94}$ and $T_{94}$ at the start of the intermediate speed range are equivalent to their values at the end of the low speed range as shown in FIGURE 3. In the intermediate speed range, motor displacement is changed from zero at the 1–2 shift point to maximum negative displacement at the 2–3 shift point while pump displacement is changed from maximum positive displacement at the 1–2 shift point to zero at the 2–3 shift point. The pump now reverses its rotational direction and has a backward speed which increases while motor speed in its forward direction now decreases. The speed of the forwardly rotating combiner gear set's input sun gear 120 is thus decreased and since its speed component subtracts from the forward speed component of the combiner gear set's input carrier 116, the speed of the hydromechanical output shaft 26 increases with the decreasing forward motor speed throughout the intermediate speed range. Motor torque $T_{94}$ reverses and increases throughout the intermediate speed range reaching a maximum negative value at the 2–3 shift point, while pump torque $T_{74}$ remains forward and decreases finally reaching zero at the 2–3 shift point.

The mechanical power transmitted by the input-split mechanical power path from gear set 54 to the output shaft 26 in the intermediate speed range decreases from full power at the 1–2 shift point with increasing output speed until no mechanical power is transmitted by this power path at the 2–3 shift point. The forward mechanical power transmitted by the output-split mechanical power path through the engaged intermediate-high drive clutch 110 increases from zero at the 1–2 shift point at a relatively rapid rate in the low speed end of the intermediate speed range with the rate gradually decreasing with increasing output speed until the output-split mechanical power path carries all of the input power forwardly at the 2–3 shift point. The 2–3 shift point is determined by the output-split mechanical power path's gear ratio when the motor shaft 94 and thus the combiner gear set's input sun gear 120 is at zero speed. This combination of input-split and output-split power drive in the intermediate speed range results in no gear regeneration and slight hydraulic regeneration which is shown by the negative (−) values of the hydraulic power $P_{22}$ in FIGURE 3. This hydraulic regeneration is carried back forwardly only by the output-split mechanical power path through the engaged intermediate-high drive clutch 110. As shown in FIGURE 3 the hydraulic power $P_{22}$ is initially zero at the beginning of the intermediate speed range and increases in value in the backward power flow direction until it reaches a maximum negative value of approximately one-fourth full input power at about three-eighths of the way through the intermediate speed range. In my particular arrangement, $P_{22} = -0.246$ at an output speed $N_{26} = 0.500$. Thereafter, the backward flowing hydraulic power gradually decreases with increasing output speed until the hydraulic power path through the hydrostatic unit 22 transmits no power which occurs at the optimum 2-3 shift point. With the gear teeth numbers given for the output-split mechanical power path, the optimum 2-3 shift point occurs at an output speed of 0.826 which is slightly below input speed.

The speed ratio between the driving clutch member of the high drive clutch 90 and the hydromechanical output shaft 26 has been determined so that in clutch 90 at the 2-3 shift point the driving clutch member which is connected to the output sun gear 88 in the splitter gear set 56 is rotating in the same direction and at the same speed as the driven clutch member which is connected to the pump input shaft 74. This is illustrated in FIGURE 3 by the clutch slip speed $\Delta N_{90}$ of clutch 90 which differential speed is shown as being zero at this 2-3 shift point. Since the pump torque $T_{74}$ is zero at the output speed corresponding to the 2-3 shift point, the high clutch 90 is torque unloaded in addition to being speed synchronized at this point. Accordingly, for an optimum shift between the intermediate and high drive, the low-intermediate drive clutch 72 is disengaged and the speed and torque synchronized high clutch 90 is engaged while the low drive brake 106 remains disengaged and the intermediate-high drive clutch 110 remains engaged. The driving and driven clutch members of the now disengaged low-intermediate drive clutch 72 rotate in the same direction and at the same speed at this 2-3 shift point and since the pump torque is zero at this point, the low-intermediate drive clutch 72 is speed and torque synchronized for a 3-2 downshift from the high drive to the intermediate drive at this point.

The values of $N_{74}$, $T_{74}$, $N_{94}$ and $T_{94}$ immediately before and after the optimum intermediate to high shift are the same as shown in FIGURE 3. The input-split is now effected by the high speed coverage splitter gear set 56. This provides a fixed gear ratio between the hydromechanical input shaft 25 and the pump input shaft 74 which is lower (less speed reduction and torque multiplication) than that with operation of the low speed coverage power splitter gear set 54. This fixed low gear ratio is determined by assuming that the ring gear 86 of gear set 56 is held. Furthermore, this fixed low gear ratio provides drive to the pump in a direction opposite the fixed high gear ratio drive to the pump. In the high speed range, motor displacement is decreased to zero from its maximum negative displacement at the 2-3 shift point while pump displacement is increased from zero at the 2-3 shift point to its maximum negative value. The pump speed $N_{74}$ now decreases in its backward direction while motor speed reverses direction and has an increasing backward speed. The direction of rotation of the combiner gear set's input sun gear 120 is thus changed to its backward direction and therefore provides an increasing forward drive speed component to increase output shaft speed in its forward direction in cooperation with the forward drive speed component of the input driven combiner gear set's input carrier 116. Pump torque $T_{74}$ reverses direction at the beginning of the high speed range and continues to increase as a negative torque with output speed while motor torque $T_{94}$ remains in its backward direction and decreases to zero at the highest output speed.

The mechanical power transmitted by the input-split mechanical power path from gear set 56 to the output shaft 26 in the high speed range increases from zero at the 2-3 shift point with increasing output speed until all of the mechanical power is transmitted by this power path at the highest output speed. The forward mechanical power transmitted by the output-split mechanical power path through the engaged intermediate-high clutch 110 decreases from full power at the 2-3 shift point with increasing output speed until no mechanical power is transmitted by this power path at the highest output speed. The hydraulic power $P_{22}$ being initially zero at the beginning of the high speed range now increases in the forward hydraulic power flow direction until it reaches a maximum positive value at about three-eighths of the way through the high speed range. In my particular arrangement. $P_{22}=0.122$ at an output speed $N_{26}=1.056$. This maximum hydraulic power value is a small fraction of the maximum input power and less than the maximum negative hydraulic power transmitted in the intermediate drive range. Thereafter, the forwardly flowing hydraulic power gradually decreases with increasing output speed until the hydraulic power path through the hydrostatic unit 22 transmits no power which occurs at the highest output speed of 1.35 (overdrive) with the motor at zero displacement and the pump at maximum negative displacement.

Thus, the hydromechanical power train is operable to provide input-split-power drive without either gear or hydraulic regeneration for low speed operation, compound-split-power drive with no gear regeneration and relatively small hydraulic regeneration which never exceeds input power for intermediate speed operation and compound-split-power drive without either gear or hydraulic regeneration for high speed operation. Since hydraulic regeneration occurs only during the intermediate speed range and then never exceeds input power, the duty requirements for the hydrostatic unit are low, resulting in prolonged hydrostatic unit life. Furthermore, at the highest output speed in high drive the hydraulic power transmitted is zero since the pump speed is zero and together with the low and intermediate drive, the hydromechanical drive train or transmission thus provides three node points where the hydraulic power transmitted is zero. These operating conditions occur at a low, intermediate and highest output speed to provide the operator with a large selection of efficient all mechanical drives. In addition, the hydromechanical drive train provides for synchronized speed and torque shifting between all of the drives so that the shifts occur without friction plate slippage and shift shock and without interruption of diminution of the power being transmitted. Since only one drive establishing device is engaged and only one such device is disengaged on a shift, the control system requirements for the drive establishing devices are simplified. It will be understood that the shifts can be made at points considerably below and above the optimum shift points without experiencing considerable friction plate slippage and shift shock in the friction drive engaging device since the relative speed (slip speed) in the device to be engaged on a shift gradually increases from zero below and above the optimum shift points. Furthermore, the hydrostatic pump and motor are not subjected to instantaneous changes in speed and torque between the transitions between the drive ranges.

DUAL OUTPUT WITH STEER BIAS FOR TRACK-LAYING VEHICLE

For use in track-laying vehicles the hydromechanical output shaft 26 transmits propulsion input drive to both the speed differential gear units 28 and 30 which have identical planetary gear members. In the connection to the right speed differential gear unit 28 the hydromechanical output shaft 26 is connected at its right end by drum 130 to the input ring gear 132 of unit 28. Ring gear 132 meshes with pinions 134 journaled on output carrier 136 which is connected to the right output shaft 14.

In unit 30 the input ring gear 138 is connected by drum 140 to the left end of hydromechanical output shaft 26. Ring gear 138 meshes with pinions 142 journaled on output carrier 144 which is connected to the left output shaft 16.

The speed differential planetary gear units are coupled by the gear train 32 which has a cross-shaft 146 suitably supported for rotation in the housing and offset from and parallel to the coaxial center axes of units 28 and 30. Shaft 146 is connected at its right end to a spur gear 148 in mesh with an idler gear 150 suported for rotation in the housing. Idler gear 150 meshes with an annular spur gear 152 which is received on the right output shaft 14 and connected to the reaction-steer input sun gear 154 which meshes with the pinions 134 in the right speed differential gear unit 28. The other end of shaft 146 is connected to a spur gear 156 which meshes with an annular spur gear 158 received on the left output shaft 16. Gear 158 is connected to the reaction-steering input sun gear 160 which meshes with pinions 142 in the left speed differential gear unit 30. The drive gear connections of shaft 146 with the differential sun gears 154 and 160 have equal ratios so that the shaft 146 receives equal and opposite torque from these sun gears when the differential ring gears 132 and 138 are being hydromechanically driven and thus provides reaction to effect drive of the differential carriers 136 and 144 and their connected output shafts 14 and 16, respectively. Thus, with the hydromechanical drives available at the hydromechanical output shaft 26 as previously discussed, the speed differential gear units 28 and 30 provide reduction gear with differential action between the hydromechanical output shaft 26 and the track driving output shafts 14 and 16. With the forward and reverse drive unit 18 the power train may be operated to provide the same three hydromechanical propulsion drives to the two outputs 14 and 16 in forward and reverse.

Figure 2:
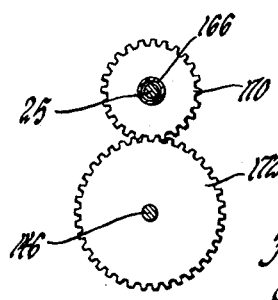
FIGURE 2 is a view taken on the line 2—2 in FIGURE 1.
Figure 5:
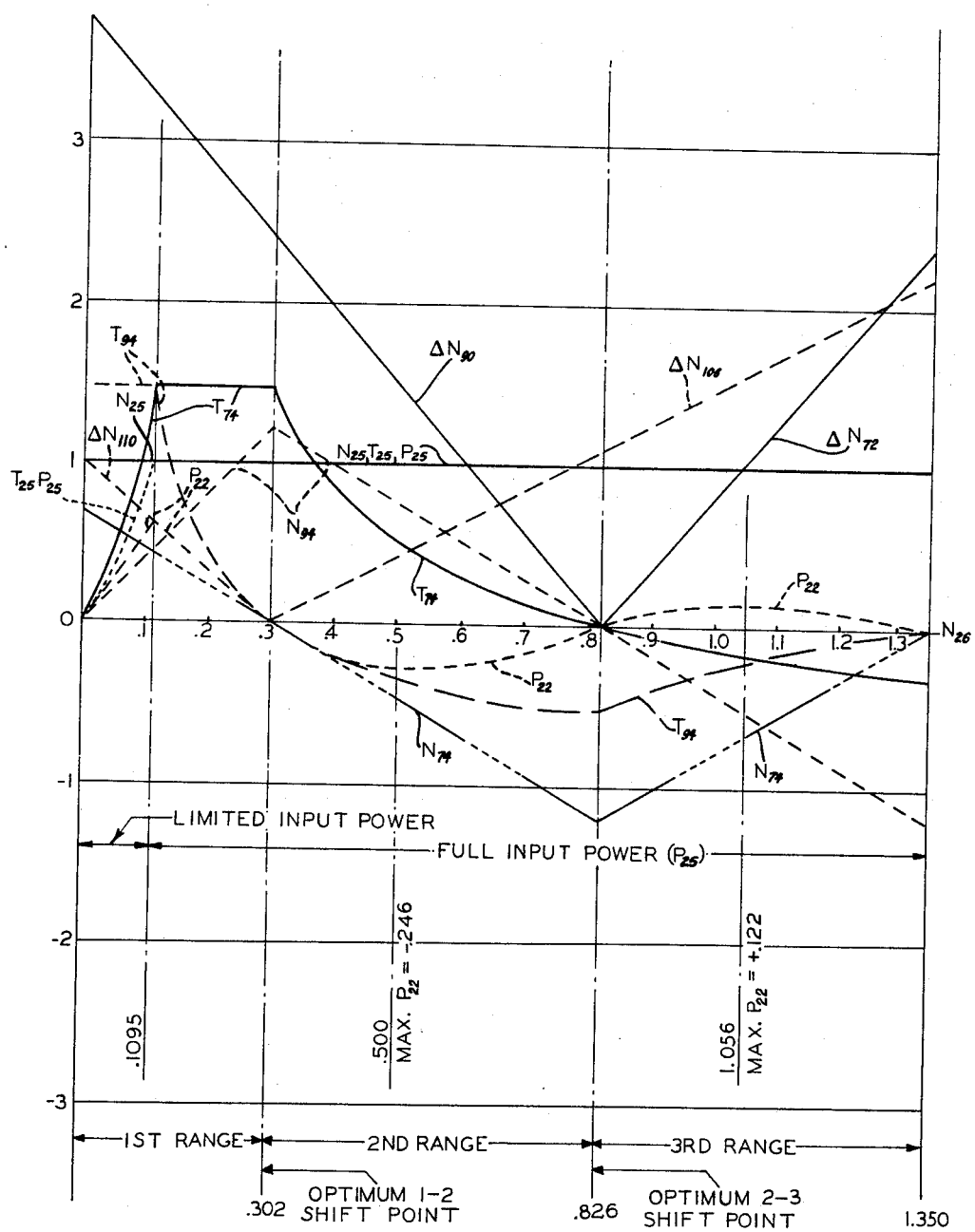

Steering is provided by integration of the hydrostatic steer unit 34 in the power train for selectively transmitting drive to shaft 146. In the hydrostatic steer drive train the steer pump 162 and steer motor 164 are concentric with the hydromechanical input shaft 25 and located between the forward drive clutch 46 and the intermediate-high drive clutch 110. The hydromechanical input shaft 25 is connected to the steer pump 162 and the steer motor 164 is provided with a motor output sleeve shaft 166 freely received on the hydromechanical input shaft 25. The hydrostatic steer unit 34 is of a conventional type with the motor 164 having a fixed displacement. The pump 162 has a variable displacement as determined by its variable angle swash plate 168 which is movable between positive (+) and negative (—) displacement positions as shown. When the steer pump's swash plate 168 is positioned as shown by the full line, the pump has a positive displacement and the steer motor's output shaft 166 is driven in its forward direction indicated by the arrow. Negative steer pump displacement as indicated by the dashed line swash plate position establishes negative pump displacements to drive the steer motor shaft in its backward direction. The steer motor output shaft 166 is connected to a spur gear 170 which is received on shaft 25 and meshes with a spur gear 172 which as best shown in FIGURE 2 is connected to the shaft 146.

STEER OPERATION

A true pivot steer operation with the dual output power train conditioned for neutral, i.e., no propulsion drive transmittal, is obtained by controlling the displacement of the pump 162 by its variable angle swash plate 168 so that the hydrostatic steer motor 164 drives its output shaft 166 in a direction to produce the desired turning direction of the vehicle. In drive train 32 with the shaft 146 being rotated by the steer motor, one of the speed differential sun gears 154, 160 is driven in its forward direction and the other speed differential sun gear is driven in its backward direction at the same speed. Since the speed differential ring gears 132 and 138 are connected and receive equal and opposite torques from the differential sun gear drives, they then provide reaction for the speed differential gear units. Thus, the output shafts 14 and 16 are driven in opposite directions at the same speed. The pivot turn direction is changed by reversing the direction of steer motor rotation.

In each of the propulsion drives driving the vehicle in the forward or reverse direction, the steer pump 162 is conditioned for zero displacement and therefore idles and permits free rotation of the hydromechanical input shaft 25 and the steer motor 164 which is thus hydraulically locked holds the motor output shaft 166. When it is desired to turn the vehicle in any one of the forward and reverse propulsion drives, the hydrostatic steer unit is conditioned by control of the steer pump's swash plate 168 so that the steer motor 164 drives its output shaft 166 and the drivingly connected shaft 146 in a direction to produce the desired turn direction. This operation drives one of the speed differential sun gears in its forward direction and the other speed differential sun gear in its backward direction and at the same speed. In the propulsion drives, the speed differential ring gears 132 and 138 are both being rotated in the same direction and at the same speed, their direction determining the direction of vehicle motion. Then, with the opposite steer drives to the speed differential sun gears, the speed added to one track driving output shaft by its driving speed differential sun gear is equal to the speed substracted from the other track driving output shaft by its speed differential sun gear while the driving speed differential ring gears continue to be driven at the speed determined by the acting propulsion drive. Thus, there is provided an enforced speed differential between the two track driving output shafts 14 and 16 with the steer radius being under positive control and being infinitely variable in all forward and reverse drives. Thus, there is provided an infinite selection of differential steer ratios in all of the propulsion drives.

The above described preferred embodiment is illustrative of the invention which may be modified within the scope of the appended claims.

What is claimed is:

1. In a hydromechanical power train the combination of an input shaft; an output shaft; a hydrostatic unit; low speed power splitter means for selectively drivingly connecting said input shaft to both said hydrostatic unit and said output shaft and providing one fixed speed ratio drive between said input shaft and said hydrostatic unit; high speed power splitter means for selectively drivingly connecting said input shaft to both said hydrostatic unit and said output shaft and providing another fixed speed ratio drive higher than said one fixed speed ratio drive between said input shaft and said hydrostatic unit; drive means for selectively drivingly connecting said hydrostatic unit to said output shaft; and power combiner means for selectively drivingly connecting both said input shaft and said hydrostatic unit to said output shaft.

2. The hydromechanical power train set forth in claim 1 and said low speed power splitter means, said high speed power splitter means, said drive means, and said power combiner means each including friction drive establishing means having selectively engageable members operatively connected in relation to said input shaft, said hydrostatic unit and said output shaft for providing both zero speed differential and a torque free condition in each said friction drive establishing means at a particular input shaft-output shaft speed ratio to provide speed and torque synchronization in said friction drive establishing means for optimum drive establishments.

3. In a hydromechanical power train the combination of an input shaft, an output shaft; a hydrostatic unit having a variable displacement pump and a variable displacement motor; a low speed power splitter planetary gear set having an input member drivingly connected to said input shaft, a first output member drivingly connected to said output shaft, and a second output member selectively drivingly connected to said pump by a low-intermediate drive clutch; a high speed power splitter planetary gear set having an input member drivingly connected to said input shaft, a first output member drivingly connected to said output shaft, and a second output member selectively drivingly connected to said pump by a high drive clutch; a low drive planetary gear set having an input member drivingly connected to said motor, an output member drivingly connected to said output shaft, and a reaction member connected to a low drive brake; a power combiner planetary gear set having a first input member drivingly connected to said motor, a second input member selectively drivingly connected to said input shaft by a high drive clutch, and an output member drivingly connected to said output shaft whereby engagement of said low drive brake and said low-intermediate drive clutch establishes a low speed range hydromechanical drive between said input shaft and said output shaft, engagement of said low-intermediate drive clutch and said intermediate-high drive clutch establishes an intermediate speed range hydromechanical drive between said input shaft and said output shaft, and engagement of said intermediate-high drive clutch and said high drive clutch establishes a high speed range hydromechanical drive between said input shaft and said output shaft.

4. The hydromechanical power train set forth in claim 3 and all of said clutches and said brake operatively connected in relation to said input shaft, said hydrostatic unit, and said output shaft to have a zero speed differential and a torque free condition at particular input shaft/output shaft speed ratios for providing optimum shifting between the speed ranges.

5. The hydromechanical power train set forth in claim 3 and a pair of speed differential planetary gear sets each having an input member drivingly connected to said output shaft, a steer-reaction member, and an output member which is drivingly connected to a track driving output shaft; steer-reaction connecting means operatively connecting said steer-reaction members for providing reaction to said steer-reaction members to establish drive to said track driving output shafts and for effecting with steer drive a speed differential between said track driving ouptut shafts; a hydrostatic steer unit operatively connecting said input shaft to said steer-reaction connecting means for providing steer drive to said steer-reaction connecting means.

References Cited

UNITED STATES PATENTS

| | | | |
|---|---|---|---|
| 2,377,354 | 6/1945 | Merritt | 74—720.5 X |
| 2,930,257 | 3/1960 | Christenson | 74—720.5 |
| 3,199,376 | 8/1965 | De Lahio | 74—720.5 |
| 3,250,151 | 5/1966 | Binger | 74—720.5 |
| 3,398,605 | 8/1968 | Ainsworth et al. | 74—720.5 |

ARTHUR T. McKEON, Primary Examiner

U.S. Cl. X.R.

74—687